United States Patent [19]

Hassell et al.

[11] Patent Number: 4,972,883
[45] Date of Patent: Nov. 27, 1990

[54] METHOD AND APPARATUS FOR DISPENSING BEVERAGE WITH AUTOMATIC SHUT-OFF IN RESPONSE TO A PROBE SENSED BEVERAGE LEVEL

[75] Inventors: David A. Hassell, Anoka, Minn.; Karl A. Senghaas, San Antonio, Tex.

[73] Assignee: The Cornelius Company, Anoka, Minn.

[21] Appl. No.: 528,917

[22] Filed: May 23, 1990

Related U.S. Application Data

[63] Continuation of Ser. No. 212,415, Jun. 27, 1988, abandoned.

[51] Int. Cl.⁵ .................... B65B 3/04; B65B 3/26
[52] U.S. Cl. .................... 141/001; 141/86; 141/95; 141/198; 141/362; 141/369
[58] Field of Search .......... 141/1, 94, 95, 96, 83, 141/128, 192, 193, 360–362, 86, 369; 137/392

[56] References Cited

U.S. PATENT DOCUMENTS

| | | | |
|---|---|---|---|
| 2,639,078 | 5/1953 | Karlen | 141/1 |
| 3,670,765 | 6/1972 | Haynes | 137/392 |
| 3,839,645 | 10/1974 | Nickerson | 307/118 |
| 3,916,963 | 11/1975 | McIntosh | 141/198 |
| 4,236,553 | 12/1980 | Reichenberger | 141/198 |
| 4,317,475 | 3/1982 | Miller et al. | 141/95 |
| 4,437,497 | 3/1984 | Enander | 141/1 |
| 4,458,735 | 7/1984 | Houman | 141/95 |
| 4,522,237 | 6/1985 | Endo et al. | 141/95 |
| 4,549,675 | 10/1985 | Austin | 137/607 |
| 4,559,979 | 12/1985 | Koblasz et al. | 141/95 X |
| 4,641,692 | 2/1987 | Bennett | 141/95 |
| 4,708,155 | 11/1987 | Austin | 137/594 |
| 4,712,591 | 12/1987 | McCann et al. | 141/95 X |
| 4,738,285 | 4/1988 | Belland | 141/1 |
| 4,753,277 | 6/1988 | Holcomb et al. | 141/95 |

FOREIGN PATENT DOCUMENTS 2921663 12/1980 Fed. Rep. of Germany ........ 141/95

Primary Examiner—Ernest G. Cusick
Attorney, Agent, or Firm—Kinney & Lange

[57] ABSTRACT

An automatic beverage dispensing system includes a probe assembly for automatically shutting off dispensing when dispensed beverage reaches a predetermined level. Upon initial shut-off, a waiting period occurs during which the foam portion at top of the beverage is allowed to settle. At the end of the wait period, an additional top-off period is initiated during which beverage is again dispensed to top-off the beverage to the desired level.

27 Claims, 4 Drawing Sheets

METHOD AND APPARATUS FOR DISPENSING BEVERAGE WITH AUTOMATIC SHUT-OFF IN RESPONSE TO A PROBE SENSED BEVERAGE LEVEL

BACKGROUND OF THE INVENTION

1. Field of the Invention.

This invention pertains to a method of and an apparatus for dispensing beverage into an open receptacle with automatic dispensing shut-off in response to an electrical sensing of the level of dispensed beverage in the receptacle with an electrically conductive probe.

2. Description of Prior Art.

Dispensing of cold carbonated soft drinks is well known and has been witnessed by virtually every person in the United States. In the original mode of fountain dispensing, a "soda jerk" held a glass in one hand and manipulated a dispensing lever in the other hand and visually ascertained when the glass was full and then manually shut-off the dispenser. The next level of sophistication in dispensing, which was done primarily to increase the speed of dispensing and the productivity of counter workers, was to provide an actuator lever under the dispenser. The counter worker could then hold a glass in each hand, hold both glasses—one each against a respective dispensing valve actuator lever—and fill two glasses at a time.

Another method and structure provided to increase productivity was a timer-controlled dispenser. The original version of this device is the coin-operated cup-filling vending machine. The fountain dispensing adaptation of this is commonly referred to in the beverage dispensing industry as a "portion control". A typical portion control, as it is presently offered by several manufacturers and used by most fountain retailers, is an add-on electronic control having four push buttons and three adjustable timers. Three of the buttons provide small, medium and large portions via the three timers respectively. Each timer is adjustable to give a dispensing period of a user-set predetermined time. The fourth button is an overriding stop button. These portion controls are commonly seen today in theatres and fast food retail outlets. These portion controls were the state-of-the-art in carbonated beverage dispensing until the commercial success of the device of L. M. McIntosh U.S. Pat. No. 3,916,963 which will be hereinafter discussed.

The dispensing of carbonated soft drinks is not quite as easy as filling a glass with water or pouring a cup of coffee; it is much more complex and prone to adverse spurious events. Water, coffee, and other non-carbonated beverages do not foam and for the most part flow at predictable and pre-set rates. What you see in a glass or cup is what you have. The top level of the dispensed water or coffee is just that, it is the actual top level. Ice is not used with hot coffee and other hot beverages. The dispensing of hot water and hot non-carbonated beverages can be acceptably controlled and portioned with a timer together with some type of volumetric flow rate control.

Carbonated beverages are a different and relatively difficult fluid to dispense and to control. Carbonated beverages are almost always cooled down to about 32° to 38° F. (0° to 2° C.) and propelled by carbon dioxide gas. There are two basic types of carbonated beverage. Each type of beverage requires a specific type of dispensing valve. The first and now most-commonly seen type of carbonated beverage is "post-mix", wherein discrete supplies of syrup and carbonated water are supplied to a beverage dispensing head and are discretely valved and then combined together in a nozzle to form the complete beverage during flow into a beverage receptacle. Post-mix is now the preferred mode of soft drink dispensing in theatres and fast food retailers. The second type of carbonated beverage is "pre-mix", wherein a complete beverage is provided in a bulk vessel to the retailer. As an example, beer and wine are distributed and dispensed like this, as is pre-mix soft drink. Pre-mix soft drink is typically used where local water is of poor quality, or not available.

Carbonated beverage is difficult to handle because of the many variables and unexpected aberrations that occur. These include variations in the amount of ice, decarbonation and foaming, flow rate variations and beverage ratio variations. Customers will come in and unpredictably ask for "no ice", "some ice", "lots of ice", or "full of ice". Each counter person has a different standard of measure to satisfy each of these requests. Portion controls cannot compensate or consider whether or not there is ice in a cup. In addition, ice temperature influences volumetric efficiency of the beverage fill. If the ice has been warmed up to 32° F. (0° C.) and is not sub-cooled and has rounded edges, chilled carbonated beverage poured upon it will usually not foam. If the ice is sub-cooled, the carbonated beverage will foam and then collapse. Volumetric fills of only 25% are common when carbonated beverage is poured over sub-cooled ice. This phenomenon is commonly seen domestically when soft drinks are poured on ice cubes. It is irritating at home; and it is economically unviable in retailing. Portion controls cannot compensate for this phenomenon.

Decarbonation during dispensing is a phenomenon which can be caused by ice as just explained, but which is usually caused by something else. Decarbonated soft drink or beer is commonly called "foam", and is seen on top of beer and soft drinks. It sometimes is desirable on beer and is referred to as the "head". It is objectionable on soft drinks and causes a short fill. The U.S. consumer generally prefers a full glass of beer rather than ¾ fill and ¼ head. The European customer, in contrast, generally prefers a head. Decarbonation and foaming can be caused by turbulent flow in the dispensing head or nozzle, loss of or consumption of cooling capacity, overcarbonation, subcooling of beverage, too warm beverage, dirty or contaminated dispensing heads, dispensing valves which are only partially open, incorrect flow rates, bad water, dirty glasses, positioning the receptacle incorrectly, particulate in either syrup or water, and many other unpredictable causes.

Different beverages have different foaming characteristics. For example, low carbonated orange beverages seldom foam. Lemon-lime beverages seldom foam. Colas foam and are a problem. Root beer is a notorious foamer. Dietetic colas, which are also notorious foamers, are becoming the most popular new beverage in the 1980's.

Volumetric flow rates and beverage ratios delivered by carbonated beverage dispensers tend to change unpredictably over time. As ambient conditions, cooling capacities, propellant pressures, flow control obstruction, and draw rates vary between slack times and peak draw periods (i.e. lunch and evening meal times), the flow rates of beverage change. The standard nominal flow rate has been 1.5 ounces per second. This can easily and unpredictably vary between 1.0 and 2.0 ounces/second over the course of a day.

Portion controls have not been able to compensate for decarbonation, foaming, ice variation, and varying flow rates. Portion controls will work if everything is perfect and repetitively identical. Reality is seldom so idyllic.

The next effort to improve serving speed and productivity is to increase flow rates. Whereas the standard flow rate remains at 1.5 ounces/second, "high-flow" is now 2.5 ounces/second and experimental dispensing systems are attaining 5 ounces/second. These higher flow rates aggravate and multiply the previously explained problems and further require much faster reactive controls.

While these efforts at increased output and efficiency have been undertaken, a parallel line of effort has been made at devising an automatic dispensing shut-off control sysem that is responsive to the actual level of dispensed beverage in the receptacle, rather than time, flow rate, cup size or other merely secondary criteria. The physical level of dispensed beverage with respect to the upper rim of the beverage receptacle, is the primary criterion to determine a proper fill and portion of beverage.

One particularly advantageous approach for providing automatic shut-off uses an electrically conductive probe assembly for sensing dispensed beverage level. Examples of early attempts at this type of automatic shut-off control are shown in the Karlen U.S. Pat. No. 2,639,078, the Haynes U.S. Pat. No. 3,670,765 and the Nickerson U.S. Pat. No. 3,839,645.

In the McIntosh U.S. Pat. No. 3,916,963, use of an electrically conductive probe for sensing level of dispensed carbonated beverage was combined with an actuator lever. This provides a simple and effective way of both starting the dispensing (by mechanical movement of the probe/actuator lever) and stopping dispensing (by electrical contact of the liquid/foam beverage with the probe). Other later examples of the type of carbonated beverage dispenser control first proposed by McIntosh are shown in the Reichenberger U.S. Pat. No. 4,236,553, the Bennett U.S. Pat. No. 4,641,692, the McCann et al U.S. Pat. No. 4,712,591, and the Holcomb et al U.S. Pat. No. 4,753,277. Automatic shut-off devices of this type have found considerable commercial acceptance in the last few years, and represent a significant advance in the state of the art of automatic beverage dispensing.

SUMMARY OF THE INVENTION

The present invention is based upon the discovery that, despite the many advantages offerred by automatic shut-off controls using an electrically conductive beverage level probe assembly, operation of these devices in some geographic regions has resulted in less satisfactory performance than in other regions. In particular, automatic shut-off controls using electrically conductive probe assemblies have exhibited premature shut-off, start/stop chatter, and failure to dispense at all in certain locations, while operating virtually failure-free in other locations.

We have discovered that failures of this kind particularly occur in those geographic regions having high humidity and in food retailing facilities having high temperatures or high humidity, or both. In addition, we have found that variations in use cycles can result in failures to turn on and to turn off predictably. Some dispensers operate infrequently, others operate once every few minutes for the better part of business hours, while still others may be unused for most of a day and be in operation almost continually for one to two hours without interruption during peak meal serving periods.

With the present invention, significant improvement to automatic shut-off controls which use an electrically conductive probe assembly is achieved by providing an automatic top-off feature, in which the solenoid valve controlling the flow is reacctuated subsequent to an initial shut-off period. Dispensing continuues until the electrically conductive probe assembly again makes electrical contact with the dispensed beverage.

With the automatic top-off feature, the foam which caused initial automatic shut-off of dispensing is permitted to collapse and the subsequent top-off dispensing provides a more complete fill of the receptacle.

With other embodiments of the present invention, the accuracy of filling in an automatic shut-off control using an electrically conductive beverage level probe assembly is improved by providing means for adjusting the electrical response sensitivity of the automatic control. By adjusting the electrical response sensitivity, environmental factors such as high humidity can be compensated.

DETAILED DESCRIPTION OF THE PREFERRED EMBODIMENTS

Figure 1:
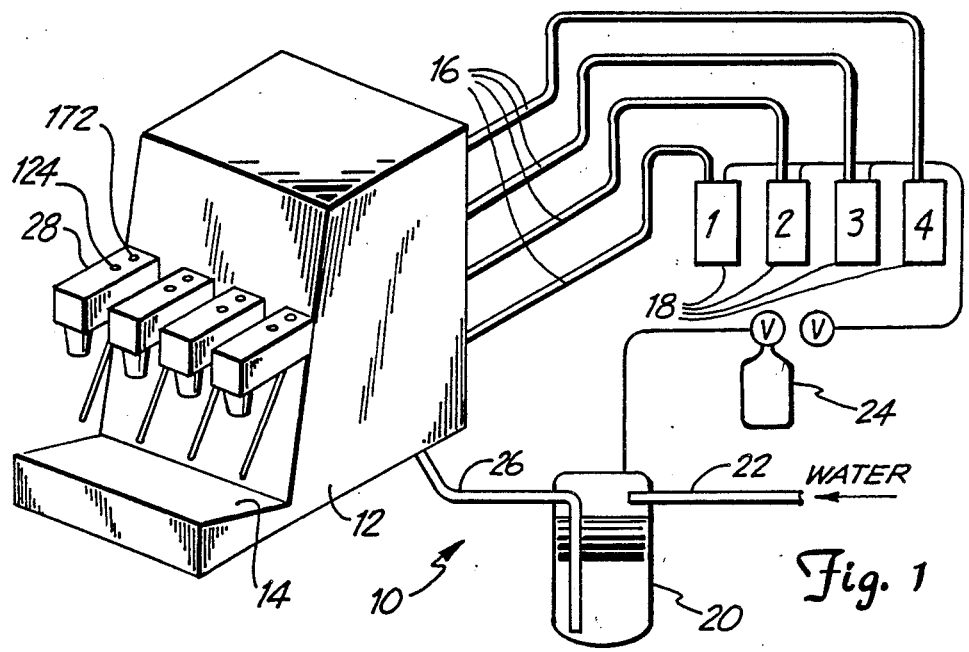
FIG. 1 is a schematic view of a cold carbonated beverage dispensing system according to the present invention.

The principles of the present invention are particularly useful when embodied in cold carbonated beverage dispensing system 10 shown in FIG. 1. The system 10 includes a cold carbonated beverage dispenser 12 having a cooling system (not shown); a receptacle rest 14 which is preferably tilted rearward for beverage receptacles such as cups, glasses, and pitchers; individual inlet lines 16 from a plurality of discrete sources 18 of different beverage syrups in the case of post-mix or a plurality of different flavor beverages in the case of pre-mix soft drinks or beer. As specific examples, the different syrups or pre-mix soft drinks may be cola, diet cola, lemon-lime, diet lemon-lime, root beer, orange, tropical punch, tonic, real juice, fruit beverage and so forth. If alcoholic beverages, they can be draft regular, draft light, ale, stout, wines, wine coolers, and so forth. If the system 10 is a post-mix dispenser (as shown in FIG. 1), a carbonator 20 connectible to a source 22 of water is also provided. A carbon dioxide source 24 is connected to the syrups or beverages 18 and to the carbonator 20 and a carbonated water line 26 fluidly leads to the dispenser 12.

At least one and preferably a plurality of dispensing heads 28 are mounted on the dispenser 12. It is quite commonplace to see a dozen dispensing heads 28 on one dispenser 12. A dozen heads 28 will typically have six to ten different and discrete flavors of beverage. A typical post-mix dispensing head is shown in the F. L. Austin U.S. Pat. No. 4,549,675 and the disclosure and teachings therein are incorporated hereinto by reference. A typical pre-mix, beer or wine valve is shown in F. L. Austin et al U.S. Pat. No. 4,708,155 and the disclosure and teachings therein are incorporated hereinto by reference.

Figure 2:
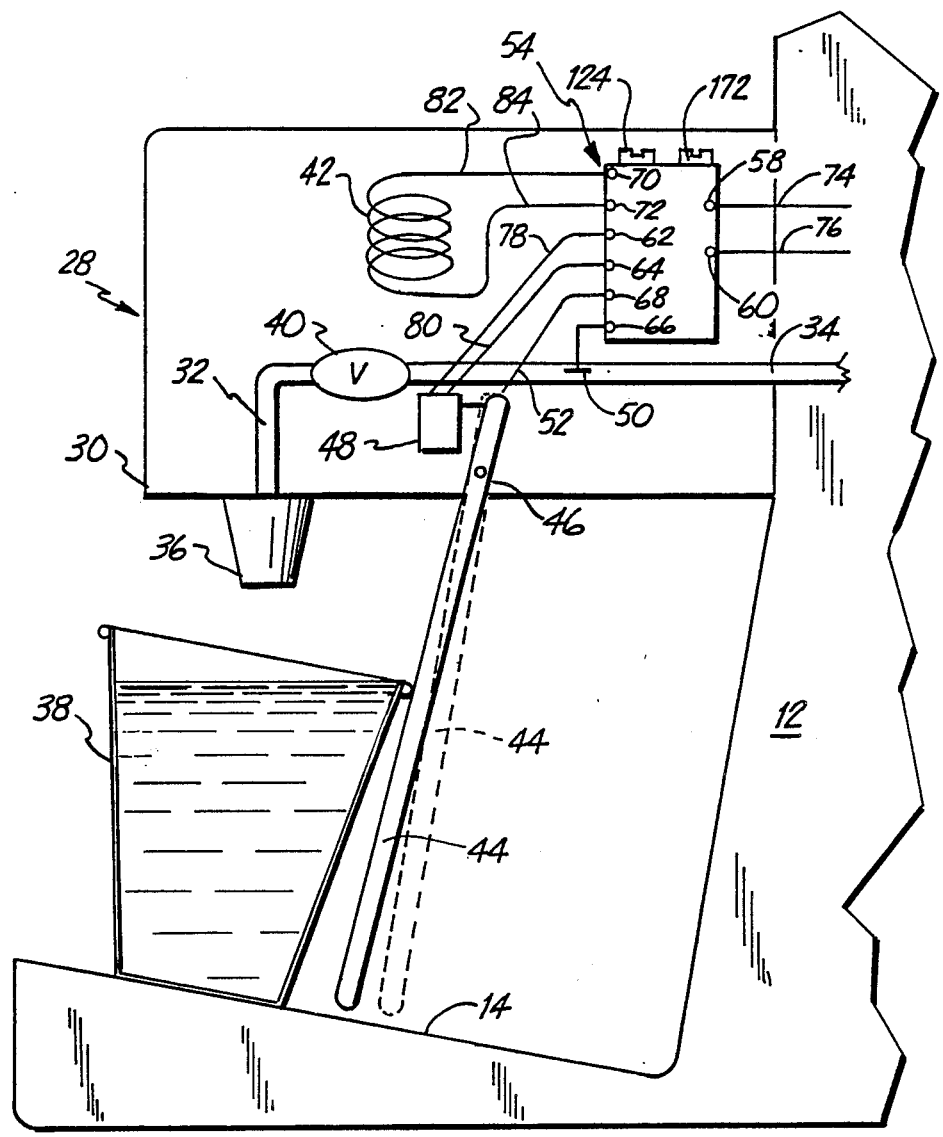
FIG. 2 is an elevational cross-sectional schematic view of the dispensing head per se of the present invention.

Each dispensing head 28, as best seen in FIG. 2, has a valve body 30 having a beverage passageway 32 with an inlet 34 connectible to the appropriate source 18, 20 of beverage and a nozzle 36 for discharge of beverage into receptacle 38. The head 28 has at least one normally closed beverage valve 40, which is operatively connected to and powered by an electric solenoid 42. An elongate and generally vertical electrically conductive beverage level probe 44 is provided below and to the rear of the nozzle 36. The probe 44 may be a stationarily fixed structure or may be pivotally suspended from a fulcrum 46 as shown. A normally open dispensing actuator switch 48 is provided to start dispensing. When the probe 44 is movable as is shown, the probe 44 doubles in structure and function as an actuator to operate the actuator switch 48 and start dispensing in response to the pushing back of probe 44 by the receptacle 38. The actuator switch 48 may alternatively have a pushbutton for manual start, or may be a photo electric or other non-intrusive device to sense the presence of the receptacle 38 to start dispensing.

A beverage electrification lead 50 is connected fluidly and electrically into the beverage passageway 32, and a beverage probe lead 52 is connected to the probe 44. The dispensing valve solenoid 42, actuator switch 48, beverage electrification lead 50 and the probe 44 and probe lead 52 are all connected to an automatic dispensing shut-off control 54, which is automatically responsive to the level of the dispensed cold carbonated beverage in the receptable 38.

Figure 3A:
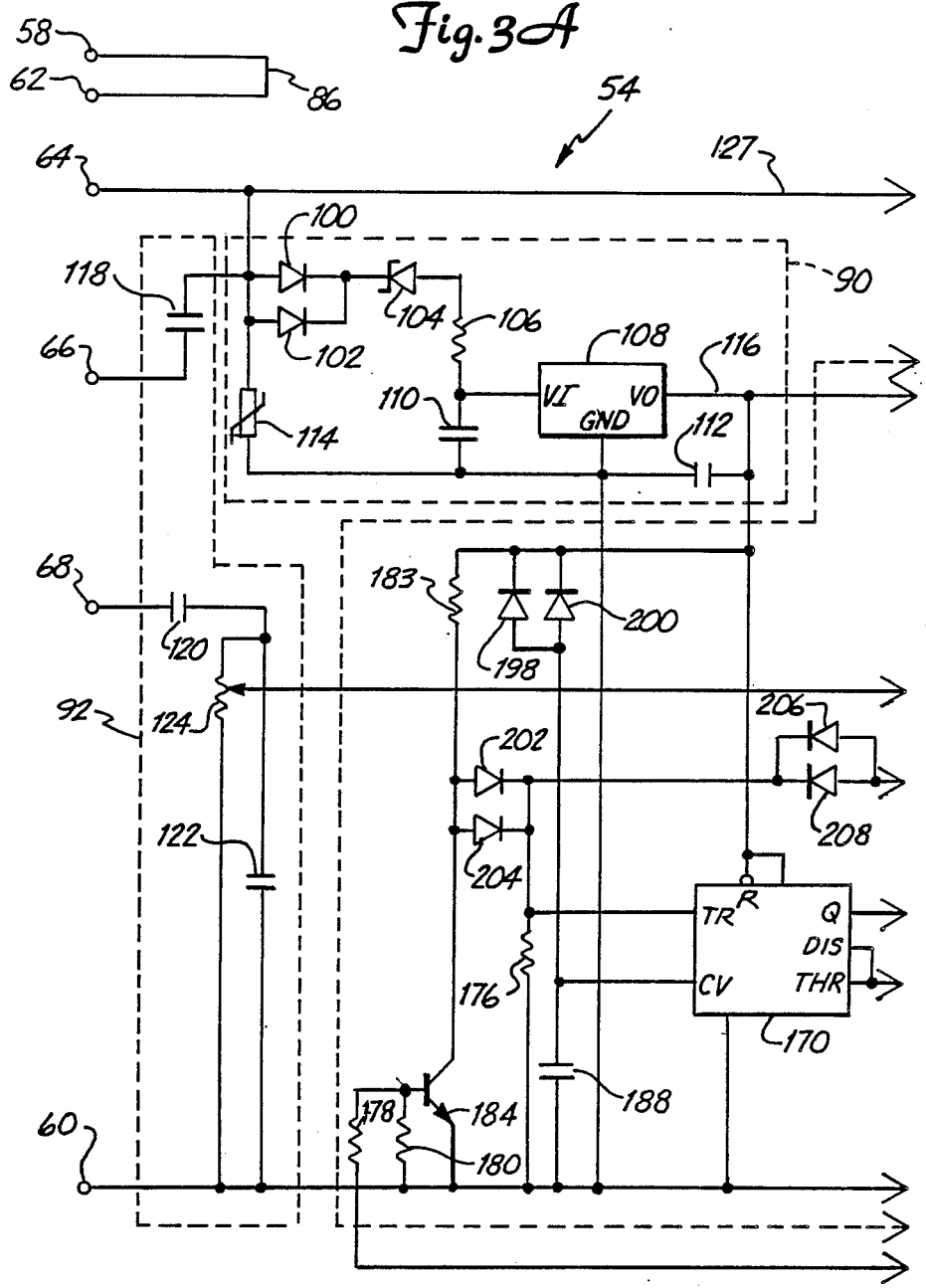
FIGS. 3A and 3B are a schematic circuit diagram of the control of the present invention.
Figure 3B:
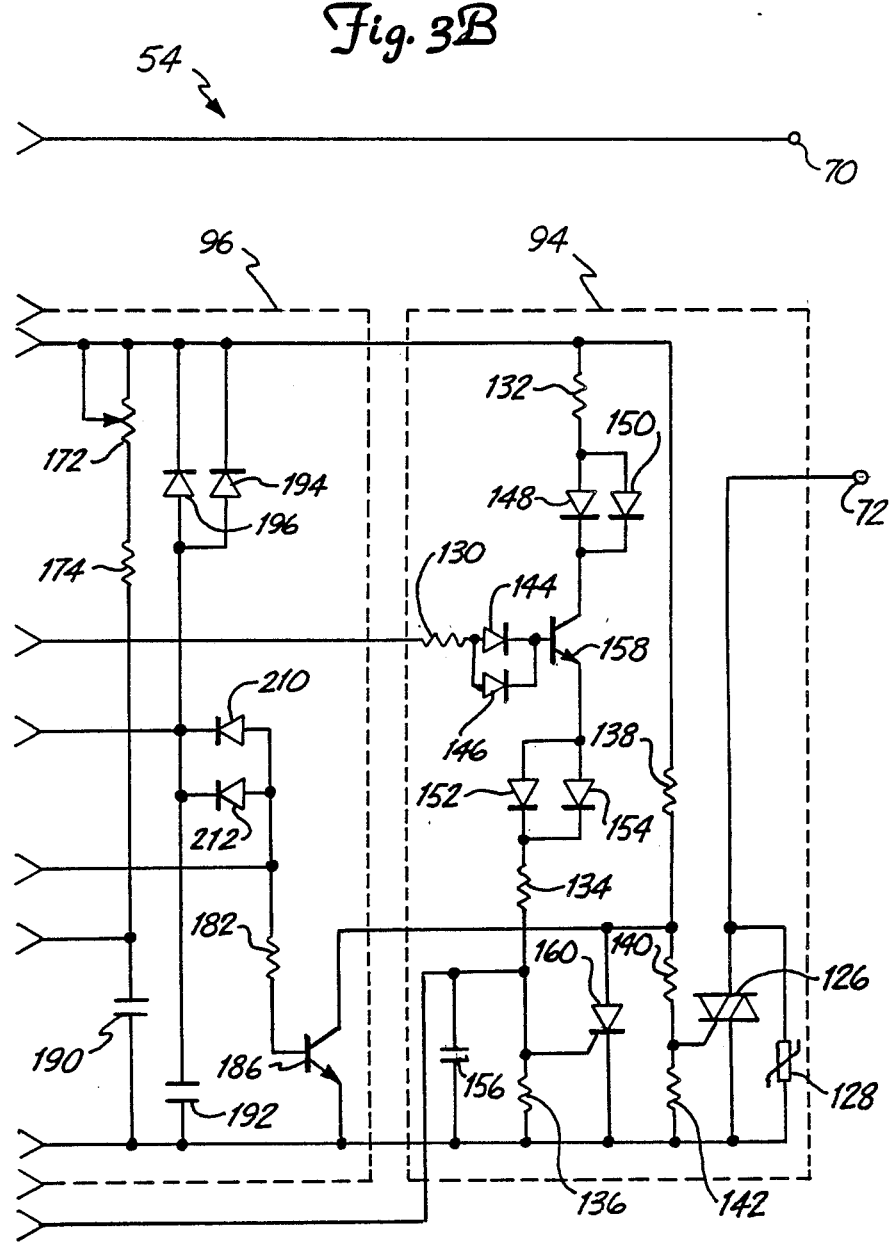

Automatic shut-off, control 54 shown in FIG. 2 and in FIG. 3A and 3B are has eight terminals: Power terminals 58 and 60, actuator switch terminals 62 and 64, probe terminals 66 and 68, and solenoid coil terminals 70 and 72. Power wires 74 and 76 connect a source of 24 volt AC electric power (not shown) to power terminals 58 and 60 of control 54. Wires 78 and 80 connect actuator switch 48 to terminals 62 and 64, respectively, of control 54. Lead 50 is connected to terminal 66 and probe 44 is connected through lead 52 to terminal 68. Wires 82 and 84 connect solenoid coil 42 with solenoid terminals 70 and 72, respectively.

FIGS. 3A and 3B are an electrical schematic diagram showing the preferred of automatic control 54. AC power to control 54 is supplied between terminals 58 and 60. Terminal 58 is connected by conductor 86 to terminal 62, so that actuator switch 48 is, in essence, in series with the circuitry of control 54. When actuator switch 48 is closed, AC power is supplied to energize control 54. When switch 48 is open, all power is removed from control 54, and therefore from leads 50 and 52 as well as from solenoid coil 42.

Control 54 has four main circuits, regulated power supply 90, probe circuit 92, solenoid control circuit 94, and top-off circuit 96.

Regulated power supply circuit 90 includes diodes 100 and 102, zener diode 104, resistor 106, voltage regulator 108, capacitors 110 and 112, and metal oxide varistor (MOV) 114. Diodes 100, 102 and 104, resistor 106, and capacitor 110 form a half-wave rectifier and filter which applies an input voltage to voltage regulator 108. The output of regulator 108 establishes a regulated voltage of +12 volts between node 116 and terminal 60.

Probe circuit 92 includes capacitors 118, 120, and 122 and potentiometer 124. Probe circuit 92 provides a circuit between terminal 64 and terminal 60, between which an AC voltage will appear whenever switch 48 is closed. Conductance through circuit 92 depends upon the impedance between terminals 66 and 68, and thus the impedance between lead 50 connected to beverage passage way 32 and lead 52 attached to probe 44.

Solenoid control circuit 94 provides AC power between terminals 70 and 72 to energize solenoid coil 42 when triac 126 is turned on. Terminal 70 is connected by conductor 28 to terminal 64 and thus to switch 48. When switch 48 is closed, AC voltage appears between terminals 60 and 64 and therefore between terminal 70 and terminal 60. If triac 126 is turned on, a circuit path is completed through solenoid coil 42 from terminal 70, through terminal 72 and triac 126, to terminal 60.

Solenoid control circuit 94 includes triac 126, MOV 128, resistors 130, 132, 134, 136, 138, 140, and 142; diodes 144, 146, 148, 150, 152 and 154; capacitor 156, transistor 158, and SCR 160. Solenoid control circuit 94 is powered from node 116 of power supply circuit 90 and is connected to terminal 60. Circuit 94 receives an input from probe circuit 92 and from top-off control 96. Control 94 initially shuts off dispensing by de-energizing coil 42 in response to a signal from probe circuit 92. After a top-off delay period timed by top-off control 96, solenoid control circuit 94 subsequently re-energizes solenoid coil 42 to top-off the beverage in the receptacle 38. Control 94 again turns off dispensing during the top-off phase of operation based upon a signal from probe circuit 92.

Top-off control circuit 96 includes timer 170, potentiometer 172, resistors 174, 176, 178, 180, 182 and 183, transistors 184 and 186, capacitors 188, 190 and 192, and diodes 194, 196, 198, 200, 202, 204, 206, 208, 210, and 212.

In operation, empty receptacle 38 is placed in position against level probe 44. This causes switch 48 to close, which connects power terminal 58 through conductor 86, terminal 62, switch 48 and terminal 64 to the circuitry of control 54. Power is established by the closing of switch 48, power is present at solenoid terminal 70 and 72 and solenoid coil 42 is turned on. Triac 126 of solenoid control circuit 94 is enabled by DC trigger signal from regulator 108 of power supply circuit 90 over resistor 138 and resistor 140. Resistor 142 and MOV 128 prevent self-triggering of triac 126.

As receptacle 38 fills, moisture between lever probe 44 and the liquid dispensed increases, thus decreasing the impedance between probe terminals 66 and 68 toward a point at which the AC signal across potentiometer 120 becomes strong enough to turn on transistor 158. This causes a voltage to build up across capacitor 156 which triggers SCR 160. When SCR 160 turns on, it pulls the gate of triac 126 low, thus turning off triac 126 and de-energizing solenoid coil 42. In addition, the voltage across capacitor 156 turns on transistor 184 of top-off control circuit 96. This causes timer 170 to start timing. As timer 170 operates, its Q output goes high, which turns on transistor 186. This prevents SCR 160 from being latched on, while continuing to keep triac 126 turned off.

Potentiometer 172 and capacitor 190 determine the adjustable waiting time for foam to settle by adjusting the period of timer 170. While timer 170 is running, the Q output charges capacitor 192 through diodes 210 and 212. The voltage on capacitor 192 will bring the timer trigger (TR) terminal high through diodes 206 and 208, thus disabling the next trigger.

As timer 170 times out, the Q output goes low. This turns off transistor 186, which again enables triac 126. One of two conditions can then occur. In the first condition, the foam has settled and the cup is not full, and the voltage derived from potentiomenter 124 and provided to transistor 158 will be low enough so that transistor 158 is turned off. In this case, the output voltage from the regulator 108 supplied over line 116 and resistors 138 and 140 provides a trigger to triac 126 which causes triac to turn on, which enables coil 42. The dispenser will then dispense further fluid until the voltage derived from potentiometer 124 again is sufficient to turn on transistor 158, which in turn triggers SCR 160 and turns off triac 126.

In the second condition, the voltage derived from potentiometer 124 is still high, indicating that receptable 38 is filled. In this case, transistor 158 is still turned on when timer 170 times out. This latches SCR 160 on even when transistor 186 turns off, so that triac 126 remains turned off until externally reset by removable of receptacle 38 from contact with probe lever 44.

In the embodiment shown in FIGS. 3A and 3B, only a single top-off cycle occurs. A second top-off cycle is prevented due to the stored potential in capacitor 192. From the first waiting period this potential keeps the TR terminal of timer 170 high so that it cannot be triggered a second time.

It should be recognized, however, that in other embodiments, more than one top-off cycle may have some advantage, depending upon the extent of foaming of beverage. A tradeoff must be made between the number of waiting periods and top-off period (which affect the total time required to fill the receptable 38) and the need to have a particular final level of beverage in the receptacle 38.

Probe circuit 92 has several special features. First, the use of dual capacitive coupling provided by capacitors 118 and 120 prevent any DC current flow between terminals 66 and 68 (and thus between lead 50 and probe 44. The AC sensing current is limited to less than about 0.5 mA.

Second, bypass capacitors 122 together with resistor 132 and capacitor 156 of solenoid control circuit 94, increase noise immunity by supression and integration. MOV 114 and capacitor 112 provide for transient protection.

Third, by the connection of switch 48 in series with circuit 54, the removal of receptacle 38 from the dispenser results in power being removed from circuit 54, and thus ensures that valve 40 will be closed. Dispensing will not continue if receptacle 38 is not in position to receive the beverage being dispensed.

Fourth, positive latching of triac 126 in an off state, in response to signal from potentiometer 124 first reaching the threshold, prevents solenoid valve 40 from "stuttering". This can occur due to turbulence where the signal from potentiometer 124 changes rapidly as a result of changing conditions at probe 44.

Fifth, potentiometer 124 provides a sensitivity adjustment which accomodates wide variations in operating conditions of the dispenser. By changing the threshold at which transistor 158 turns on (which starts the process of shutting off triac 126 and solenoid coil 124) wide variations in temperature and humidity can be accomodated while allowing reliable operation of the dispenser.

Sixth, potentiometer 172 allows the waiting time before top-off to be adjusted. This is an important feature because it allows the user to match the foaming characteristics of the particular beverage to the top-off wait time so that the beverage has allowed sufficient time for the foam to settle before top-off dispensing begins.

Seventh, circuit 54 provides a positive stop after the initial fill. This is due to the redundant disable feature provided by SCR 160 and transistor 184.

Eighth, circuit 54 shown in FIGS. 3A and 3B provides a single top-off cycle with a positive stop due to the disabling of timer 170 by disabling the TR terminal. This feature is provided by capacitor 192, diodes 206 and 208 and resistor 176.

In conclusion, the automatic dispensing shut-off control of the present invention provides reliable operation under a wide range of operating conditions, and ensures adequate filling of the cup or other receptacle by the use of automatic top-off feature in which a pause in operation occurs after initial shut-off, and top-off dispensing then is initiated which is terminated by the electrically conductive probe.

Although the present invention has been described with reference to preferred embodiments, workers skilled in the art will recognize that changes may be made in form and detail without departing from the spirit and scope of the invention.

What is claimed is:

1. A control for a carbonated beverage dispenser which dispenses carbonated beverage into a receptacle, the control comprising:
   level sensing means for sensing a level of dispensed carbonated beverage in the receptacle when the receptacle is positioned below the dispenser, the level sensing means including an electrically conductive beverage level probe;
   actuator means for initiating dispensing of the carbonated beverage;
   shut-off means responsive to said level sensing means for automatically shutting off dispensing when the level sensing means indicates that dispensed beverage has reached a selected beverage level; and
   means for automatically reinitiating dispensing without operation of the actuator means following a wait period after an initial automatic shut-off of dispensing if the receptacle remains in position below the dispenser during the wait period;
   wherein the actuator means includes an actuator switch which supplies power to the shut-off means and to the means for reinitiating when a receptacle is in a position to receive the dispensed beverage.

2. The control of claim 1 wherein the means for reinitiating comprises:
   timer means responsive to the automatic shut-off means for timing the wait period;
   means for maintaining the shut-off means in a shut-off mode during the wait period;
   means for re-enabling following the wait period the shut-off means to a dispensing mode in which dispensing can occur until the level sensing means has reached the selected beverage level.

3. The control of claim 2 wherein the means for reinitiating further comprises:
   means for adjusting duration of the wait period.

4. The control of claim 2 wherein the means for reinitiating further comprises:

means for preventing the timer means from generating more than a predetermined number of wait periods during one dispensing operation.

5. The control of claim 1 and further comprising:
means for adjusting sensitivity of the level sensing means to accomodate various beverages and ambients.

6. In a cold carbonated beverage dispensing head having a normally closed solenoid valve in a beverage passageway having an inlet connectible to a source of carbonated beverage, a nozzle on an outlet of the passageway, actuator means for actuating the solenoid valve to start dispensing into a receptacle under nozzle, an elongate generally vertical electrically conductive beverage level probe means suspended downward below the nozzle from the head, and electronic control means operatively connected to the probe means and the solenoid valve for automatically shutting off dispensing upon dispensed carbonated beverage in the receptacle contacting the probe; the improvement comprising:
means for automatically reactuating said solenoid valve after a wait period following automatic shut-off of dispensing without operation of said actuator means, if the receptacle has remained in position below the nozzle during the wait period, for further dispensing into and top-off of the dispensed carbonated beverage in the receptacle; and
means for supplying power to the electronic control means and the means for automatically reactuating when a receptacle is in position below the nozzle.

7. In a cold carbonated beverage dispensing head having a normally closed solenoid valve in a beverage passageway having an inlet connectible to a source of carbonated beverage, a nozzle on an outlet of the passageway, actuator means for actuating the solenoid valve to start dispensing into a receptacle under the nozzle, an elongate generally vertical electrically conductive beverage level probe means suspended downward below the nozzle from the head, and electronic control means operatively connected to the probe means and solenoid valve for shutting off dispensing upon dispensed carbonated beverage in the receptacle reaching and contacting the probe means; the improvement comprising:
means electrically interconnected with said control means for adjusting the electrical response sensitivity of said control means to contact of the dispensed carbonated beverage and said probe means;
means for automatically reactuating said solenoid valve after a wait period following automatic shut-off of dispensing, without operation of said actuator means, if the receptacle has remained in position below the nozzle during the wait period, for further dispensing into and top-off of the dispensed carbonated beverage in the receptacle;
wherein the actuator means includes an actuator switch which supplies power to the shut-off means and to the means for reinitiating when a receptacle is in a position to receive the dispensed beverage.

8. In a cold carbonated beverage dispensing system having a plurality of discrete beverage dispensing heads fluidly connectible to a plurality of discrete sources of different beverages, a nozzle and at least one solenoid controlled beverage valve in each head, actuator means for actuating each solenoid valve to start dispensing from each head into a beverage receptacle under a respective nozzle, at least one elongate generally vertical electrically conductive carbonated beverage level probe positioned below a respective nozzle of one of said dispensing heads, and electronic control means operatively connected to said probe and a respective solenoid valve for automatically shutting off dispensing upon the dispensed beverage reaching and making electrical contact with the probe; the improvement comprising:
means for automatically reactuating said solenoid valve after a wait period following automatic shut-off of dispensing, without operation of said actuator means, if the receptacle has remained in position below the nozzle during the wait period, for further dispensing into and top-off of the dispensed carbonated beverage in the receptacle,
wherein the actuator means includes an actuator switch which supplies power to the shut-off means and to the means for reinitiating when a receptacle is in a position to receive the dispensed beverage.

9. In a cold carbonated beverage dispensing system having a plurality of discrete beverage dispensing heads fluidly connectible to a plurality of discrete sources of different beverages, a nozzle and at least one solenoid controlled beverage valve in each head, actuator means for actuating each solenoid valve to start dispensing from each head into a beverage receptacle under a respective nozzle, at least one elongate generally vertical electrically conductive carbonated beverage level probe positioned below a respective nozzle of one of said dispensing heads, and electronic control means operatively connected to said probe and a respective solenoid valve for automatically shutting off dispensing upon the dispensed beverage reaching and making electrical contact with the probe; the improvement comprising:
means for automatically reactuating said solenoid valve after a wait period following automatic shut-off of dispensing, without operation of said actuator means, if the receptacle has remained in position below the nozzle during the wait period, for further dispensing into and top-off of the dispensed carbonated beverage in the receptacle,
first and second elongate generally vertical electrically conductive carbonated beverage level probes, the first probe being on a first one of said dispensing heads and the second probe being on a second one of said dispensing heads; and
means for discretely adjusting a delay period between shut-off and reactuation of said solenoid valve for each of said two dispensing heads, for accommodating the specific beverage being dispensed by each of said two dispensing heads.

10. In a cold carbonated beverage dispensing system having a plurality of discrete beverage dispensing heads fluidly connectible to a plurality of discrete sources of different beverages, a nozzle and at least one solenoid controlled beverage valve in each head, actuator means for actuating each solenoid valve to start dispensing from each head into a beverage receptacle under a respective nozzle, at least one elongate generally vertical electrically conductive carbonated beverage level probe positioned below a respective nozzle of one of said dispensing heads, and electronic control means operatively connected to said probe and a respective solenoid valve for automatically shutting off dispensing upon the dispensed beverage reaching and making electrical contact with the probe; the improvement comprising:

means for automatically reactuating said solenoid valve after a wait period following automatic shut-off of dispensing, without operation of said actuator means, if the receptacle has remained in position below the nozzle during the wait period, for further dispensing into and top-off of the dispensed carbonated beverage in the receptacle, a tilted receptacle support below said nozzle for supporting said receptacle and presenting a lowest level of a tilted upper rim of the receptacle in physical contact with said probe during dispensing and the reactuating of said solenoid valve, means for automatically reactuating the one solenoid valve associated with said one probe for automatic further dispensing into and top-off of the dispensed beverage in the receptacle; and means for selectively adjusting a wait period between shut off and reactuating of said one solenoid.

11. In a cold carbonated beverage dispensing system having a plurality of discrete beverage dispensing heads fluidly connectible to a plurality of discrete sources of different beverages, a nozzle and at lest one solenoid controlled beverage valve in each head, actuator means for actuating each solenoid valve to start dispensing from each head into a beverage receptacle under its respective nozzle, elongate generally vertical electrically conductive carbonated beverage level probes positioned one each below respective nozzles of two of the discrete dispensing heads connectible to different beverage sources, and electronic control means operatively connected to each probe and respective solenoid valve for shutting off dispensing upon the dispensed beverage making electrical contact with the probe indicating a predetermined level has been attained; the improvement comprising:

means operatively connected to at least one of said probes for adjusting the electrical response sensitivity of said control means to the electrical contact of the beverage with the probe;

means for automatically reactuating said solenoid valve after a wait period following automatic shut-off of dispensing, without operation of said actuator means, if the receptacle has remained in position below the nozzle during the wait period, for further dispensing into and top-off of the dispensed carbonated beverage in the receptacle;

wherein the actuator means includes an actuator switch which supplies power to the shut-off means and to the means for reinitiating when a receptacle is in a position to receive the dispensed beverage.

12. A method of dispensing cold carbonated beverage with automatic level responsive dispensing shut-off, comprising the steps of:

actuating and energizing a solenoid powered beverage dispensing valve;

discharging cold carbonated beverage through the energized solenoid valve and into a beverage receptacle;

sensing for a level of dispensed beverage with an electrically conductive beverage level probe connected to an automatic dispensing control;

automatically de-energizing the solenoid and shutting off dispensing with the control in response to contact of the beverage with the probe;

maintaining the receptacle in position directly below the nozzle for a wait period to allow foam to settle; and automatically re-energizing the solenoid after the wait period if the receptacle has continuously remained in position directly below the valve and repeating the steps of discharging, sensing and automatically deenergizing to top-off the receptacle with the carbonated beverage.

13. The method of claim 12 and further comprising: removing the receptacle after a second automatic dispensing shut-off.

14. The method of claim 12 and further comprising: selectively adjusting the wait period for the particular carbonated beverage being dispensed.

15. The method of claim 12 and further comprising: selectively adjusting the electrical sensitivity to contact between the dispensed beverage and the probe for accommodating a specific beverage being dispensed and the specific ambient conditions during the dispensing.

16. The method of claim 12 and further comprising; tilting the receptacle into the probe during the steps of de-energizing, re-energizing and said repeated steps.

17. The method of claim 16 and further comprising: maintaining physical contact between the probe and the lowest level of a tilted upper rim of the receptacle during the steps of de-energizing and said repeated steps.

18. The method of claim 17 and further comprising: removing the tilted receptacle and the dispensed beverage therein from physical contact with the probe and setting the receptacle upright after said repeated step of de-energizing.

19. A control for a carbonated beverage dispenser, the control comprising:

level sensing means for sensing a level of dispensed carbonated beverage;

shut-off means responsive to said level sensing means for automatically shutting off dispensing when the level sensing means indicates that dispensed beverage has reached a selected beverage level; and means for automatically reinitiating dispensing following a wait period after an initial automatic shut off of dispensing; wherein the means for automatically reinitiating comprises:

timer means responsive to the automatic shut-off means for timing the wait period;

means for maintaining the shut-off means in a shut-off mode during the wait period;

means for re-enabling, following the wait period, the shut-off means to a dispensing mode in which dispensing can occur until the level sensing means again indicates that dispensed beverage has reached the selected beverage level; and means for adjusting duration of the wait period.

20. The control of claim 19 and further comprising: actuator means for initiating dispensing of the carbonated beverage.

21. The control of claim 20 wherein the actuator means includes an actuator switch which supplies power to the shut-off means and to the means for reinitiating when a receptacle is in a position to receive the dispensed beverage.

22. The control of claim 19 wherein the means for reinitiating further comprises:

means for preventing the timer means from generating more than a predetermined number of wait periods during one dispensing operation.

23. The control of claim 19 and further comprising:

means for adjusting sensitivity of the level sensing means to accommodate various beverages and ambients.

24. A control for a carbonated beverage dispenser, the control comprising:
  level sensing means for sensing a level of dispensed carbonated beverage;
  shut-off means responsive to said level sensing means for automatically shutting off dispensing when the level sensing means indicates that dispensed beverage has reached a selected beverage level; and
  means for automatically reinitiating dispensing following a wait period after an initial automatic shut-off of dispensing; wherein the means for reinitiating comprises:
    timer means responsive to the automatic shut-off means for timing the wait period;
    means for maintaining the shut-off means in a shut-off mode during the wait period;
    means for re-enabling, following the wait period, the shut-off means to a dispensing mode in which dispensing can occur until the level sensing means again indicates that dispensed beverage has reached the selected beverage level; and
    means for preventing the timer means from generating more than a predetermined number of wait periods during one dispensing operation.

25. The control of claim 24 and further comprising:
  actuator means for initiating dispensing of the carbonated beverage.

26. The control of claim 25 wherein the actuator means includes an actuator switch which supplies power to the shut-off means and to the means for reinitiating when a receptacle is in a position to receive the dispensed beverage.

27. The control of claim 24 and further comprising:
  means for adjusting sensitivity of the level sensing means to accommodate various beverages and ambients.

* * * * *

UNITED STATES PATENT AND TRADEMARK OFFICE
CERTIFICATE OF CORRECTION

PATENT NO. : 4,972,883
DATED : November 27, 1990
INVENTOR(S) : David A. Hassell et al.

It is certified that error appears in the above-identified patent and that said Letters Patent is hereby corrected as shown below:

Col. 9, line 13, following "under", insert --the--.

Col. 11, line 22, delete "lest", insert --least--.

Signed and Sealed this

Twelfth Day of May, 1992

Attest:

DOUGLAS B. COMER

Attesting Officer

Acting Commissioner of Patents and Trademarks